(12) United States Patent
Huttunen et al.

(10) Patent No.: US 11,222,407 B2
(45) Date of Patent: Jan. 11, 2022

(54) APPARATUS, METHOD AND COMPUTER PROGRAM FOR PROCESSING A PIECEWISE-SMOOTH SIGNAL

(71) Applicant: Nokia Technologies Oy, Espoo (FI)

(72) Inventors: Janne Huttunen, Espoo (FI); Leo Kärkkäinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 53 days.

(21) Appl. No.: 16/954,234

(22) PCT Filed: Nov. 16, 2018

(86) PCT No.: PCT/EP2018/081491
§ 371 (c)(1),
(2) Date: Jun. 16, 2020

(87) PCT Pub. No.: WO2019/120792
PCT Pub. Date: Jun. 27, 2019

(65) Prior Publication Data
US 2020/0311882 A1    Oct. 1, 2020

(30) Foreign Application Priority Data
Dec. 19, 2017 (EP) .................................... 17208457

(51) Int. Cl.
*G06T 5/00* (2006.01)
*G06T 7/277* (2017.01)
(Continued)

(52) U.S. Cl.
CPC ............. *G06T 5/002* (2013.01); *G06N 7/005* (2013.01); *G06T 5/20* (2013.01); *G06T 7/277* (2017.01);
(Continued)

(58) Field of Classification Search
CPC .......... G06T 5/002; G06T 5/20; G06T 7/277; G06T 2207/20076; G06T 2207/20192;
(Continued)

(56) References Cited

U.S. PATENT DOCUMENTS

2004/0066959 A1   4/2004   Pike et al.
2006/0087703 A1   4/2006   Chen et al.
(Continued)

FOREIGN PATENT DOCUMENTS

CN    106251315 A    12/2016
EP      2642449 A2    9/2013

OTHER PUBLICATIONS

Gholami et al., "A Balanced Combination of Tikhonov and Total Variation Regularizations for Reconstruction of Piecewise-smooth Signals", Signal Processing, vol. 93, No. 7, Jul. 2013, pp. 1945-1960.
(Continued)

*Primary Examiner* — Jose L Couso
(74) *Attorney, Agent, or Firm* — Nokia Technologies Oy (57) ABSTRACT

An apparatus comprising at least one processor, and at least one memory including computer program code, wherein the at least one memory and the computer program code are configured, with the at least one processor, to: receive an input signal, the input signal comprising a piecewise-smooth signal and a noise signal; determine a prior probability density function of a representation of the piecewise-smooth signal, the representation of the piecewise-smooth signal comprising a combination of a smooth, Gaussian, variable and a jump, Cauchy, variable; determine a likelihood function based on the input signal; determine a posterior probability density function based on the likelihood function and the prior probability density function distribution; and esti-
(Continued)

mate the piecewise-smooth signal based on an estimate of a posterior probability density function.

16 Claims, 9 Drawing Sheets

(51) Int. Cl.
*G06N 7/00* (2006.01)
*G06T 5/20* (2006.01)

(52) U.S. Cl.
CPC ............... *G06T 2207/20076* (2013.01); *G06T 2207/20192* (2013.01)

(58) Field of Classification Search
CPC . G06T 2207/30004; G06T 2207/30048; G06T 2210/41; G06T 5/003; G06T 5/50; G06T 7/0012; G06N 7/005; A61M 2230/04; A61M 2210/125; A61M 5/363; A61M 5/7207; A61M 5/7264; A61M 5/02405; A61M 5/0245; A61M 5/318; A61M 5/364; A61M 5/352; A61M 5/0006; A61M 5/7217; A61M 5/316; A61M 5/341; A61M 5/349; A61M 5/7203; A61M 2560/0223; A61M 2230/10; A61M 2205/50; A61M 5/0205; A61M 5/7275; A61M 5/024; A61M 5/7282; G06K 2009/00939; G06K 9/624; G06K 9/6218; G06K 2009/6237; G06K 9/00536; G06K 9/00496; G06K 9/0051; G06K 9/00523; G06K 9/0053; G06K 9/00885; G06K 9/6217; G06K 9/6292; A61H 2201/5015; A61H 2230/0431; A61H 2230/005; G06F 16/285; G06F 17/18; A61N 1/3925; A61N 1/37; G09B 23/288; G16H 40/60; G16H 50/20; G16H 50/50; G16H 50/30; G16H 50/70; G16H 20/30; Y10S 128/92; Y10S 128/923; Y10S 128/924; Y10S 706/924
See application file for complete search history.

(56) References Cited

U.S. PATENT DOCUMENTS

| | | | | |
|---|---|---|---|---|
| 2008/0123740 | A1* | 5/2008 | Ye | H04N 19/63 375/240.11 |
| 2009/0222226 | A1* | 9/2009 | Baraniuk | H03M 13/11 702/66 |
| 2013/0311141 | A1* | 11/2013 | Peng | H01J 49/0036 702/191 |
| 2015/0081262 | A1* | 3/2015 | Yahil | G06F 17/18 703/2 |
| 2016/0331330 | A1 | 11/2016 | Freeman et al. | |
| 2017/0261584 | A1* | 9/2017 | James | G01R 33/4835 |
| 2018/0048495 | A1* | 2/2018 | Magierowski | H04L 25/061 |
| 2018/0192870 | A1* | 7/2018 | Inao | G06T 5/50 |
| 2018/0192961 | A1* | 7/2018 | Paydarfar | A61B 5/4094 |
| 2019/0012608 | A1* | 1/2019 | Teixeira | G16H 50/30 |
| 2019/0155386 | A1* | 5/2019 | Tadi | G06K 9/00536 |
| 2019/0254533 | A1* | 8/2019 | Torres | A61B 5/00 |
| 2021/0041953 | A1* | 2/2021 | Poltorak | A61B 5/0077 |
| 2021/0146117 | A1* | 5/2021 | Reich | G16H 50/50 |

OTHER PUBLICATIONS

Azzari et al., "Gaussian-Cauchy Mixture Modeling for Robust Signal-dependent Noise Estimation", IEEE International Conference on Acoustics, Speech and Signal Processing (ICASSP), May 4-9, 2014, pp. 5357-5361.
Wang et al., "New Image Restoration Method Associated with Tetrolets Shrinkage and Weighted Anisotropic Total Variation", Signal Processing, vol. 93, No. 4, Apr. 2013, pp. 661-670.
Chavez et al., "Efficient Denoising of Piecewise-Smooth Signals With forward-backward FIR Smoothers", Applied Mathematics in Electrical and Computer Engineering, Jan. 2012, pp. 169-174.
Kundu et al., "Electrocardiogram Synthesis Using Gaussian and Fourier Models", IEEE International Conference on Research in Computational Intelligence and Communication Networks (ICRCICN), Nov. 20-22, 2015, pp. 312-317.
Gao et al., "Directionlet-based Denoising of SAR Images using a Cauchy Model", Signal Processing, vol. 93, No. 5, May 2013, pp. 1056-1063.
"Total Variation Denoising", Wikipedia, Retrieved on Jun. 10, 2020, Webpage available at : https://en.wikipedia.org/wiki/Total_variation_denoising.
Markkanen et al., "Cauchy Difference Priors for Edge-Preserving Bayesian Inversion with an Application to X-Ray Tomography", arXiv, Mar. 19, 2016, pp. 1-17.
"Mumford-Shah Functional", Wikipedia, Retrieved on Jun. 10, 2020, Webpage available at: https://en.wikipedia.org/wiki/Mumford%E2%80%93Shah_functional.
Helin et al., "Hierarchical Models in Statistical Inverse Problems and the Mumford-Shah Functional", arXiv, Sep. 14, 2009, pp. 1-32.
Roininen et al., "Hyperpriors for Mat'ern fields with applications in Bayesian inversion", arXiv, Dec. 9, 2016, pp. 1-27.
"Total Variation", Wikipedia, Retrieved on Jun. 10, 2020, Webpage available at : https://en.wikipedia.org/wiki/Total_variation.
Extended European Search Report received for corresponding European Patent Application No. 17208457.6, dated Mar. 16, 2018, 9 pages.
Bhuiyan et al., "Spatially Adaptive Wavelet-Based Method Using the Cauchy Prior for Denoising the SAR Images", IEEE Transactions on Circuits and Systems for Video Technology, vol. 17, No. 4, Apr. 2007, pp. 500-507.
International Search Report and Written Opinion received for corresponding Patent Cooperation Treaty Application No. PCT/EP2018/081491, dated Dec. 19, 2018, 14 pages.
Tentative Rejection received for corresponding Taiwan Patent Application No. 107145683, dated May 28, 2020, 8 pages of Tentative Rejection and 2 pages of translation available.

* cited by examiner

APPARATUS, METHOD AND COMPUTER PROGRAM FOR PROCESSING A PIECEWISE-SMOOTH SIGNAL

RELATED APPLICATION

This application claims priority to PCT Application No. PCT/EP2018/081491, filed on Nov. 16, 2018, which claims priority to European Patent Application No. 17208457.6, filed on Dec. 19, 2017, each of which is incorporated herein by reference in its entirety.

FIELD OF INVENTION

The present application relates to apparatus, methods and computer programs for signal processing. The present application specifically relates to signal processing of piecewise-smooth signals.

BACKGROUND

Several important signals can be categorized as piecewise-smooth signals. Piecewise-smooth signals are types of signals which include sharp jumps which separate smoother regions. An example 1D piecewise-smooth signal is an Electro-cardiograph (ECG) signal which may comprise a 'jump' region and a smoother region which repeats for each beat. Higher dimensional examples of piecewise-smooth signals include 2D image data.

Techniques for piecewise-smooth signal noise reduction are known. For example image reconstruction (where the signal is a 2D piecewise-smooth image), jumps in the signal (the edges in the image) are traditionally processed using processes such using total variation (TV) regularization to reduce any noise.

A further approach has been to use Cauchy difference prior methods to carry out a similar edge-preserving reconstruction.

SUMMARY

In a first aspect there is provided: an apparatus comprising at least one processor, and at least one memory including computer program code, wherein the at least one memory and the computer program code are configured, with the at least one processor, to: receive an input signal, the input signal comprising a piecewise-smooth signal and a noise signal; determine a prior probability density function of a representation of the piecewise-smooth signal, the representation of the piecewise-smooth signal comprising a combination of a smooth, Gaussian, variable and a jump, Cauchy, variable; determine a likelihood function based on the input signal; determine a posterior probability density function based on the likelihood function and the prior probability density function distribution; and estimate the piecewise-smooth signal based on an estimate of a posterior probability density function.

The processor configured to determine a prior probability density function of a representation of the piecewise-smooth signal, the representation of the piecewise-smooth signal comprising a combination of a smooth, Gaussian, variable and a jump, Cauchy, variable may be further configured to: determine a first probability density function representing sample differences of the smooth, Gaussian, variable; determine a second probability density function representing sample differences of the jump, Cauchy, variable; and convolve the first probability density function and the second probability density function to generate the prior probability density function.

The processor configured to convolve the first probability density function and the second probability density function to generate the prior probability density function may be configured to determine: an analytical determination using at least one imaginary error function or Dawson function; and a numerical determination using a grid of sample points and interpolation for points between the grid of sample points.

The processor configured to estimate the piecewise-smooth signal based on the estimate of the posterior probability density function may be configured to estimate the piecewise-smooth signal based on a maximum a posteriori estimate of the posterior probability density function.

The processor configured to estimate the piecewise-smooth signal based on a maximum a posteriori estimate of the posterior probability density function may be further configured to minimise a combination of a logarithm of the likelihood function and a logarithm of the prior probability density function.

The processor configured to minimise the combination of the logarithm of the likelihood function and the logarithm of the prior probability density function may be configured to apply one of: Newton's methods; and Barzilai-Borwein method.

The processor configured to determine the posterior probability density function based on the likelihood function and the prior probability density function may be further configured to determine the posterior probability density function based on a product of the likelihood function and the prior probability density function according to Bayes' Theorem.

The processor may be further configured to window the measured input signal.

The smooth, Gaussian, variable and the jump, Cauchy, variable may be independent of each other.

According to a second aspect there is provided a method comprising: receiving an input signal, the input signal comprising a piecewise-smooth signal and a noise signal; determining a prior probability density function of a representation of the piecewise-smooth signal, the representation of the piecewise-smooth signal comprising a combination of a smooth, Gaussian, variable and a jump, Cauchy, variable; determining a likelihood function based on the input signal; determining a posterior probability density function based on the likelihood function and the prior probability density function distribution; and estimating the piecewise-smooth signal based on an estimate of a posterior probability density function.

Determining a prior probability density function of a representation of the piecewise-smooth signal, the representation of the piecewise-smooth signal comprising a combination of a smooth, Gaussian, variable and a jump, Cauchy, variable may further comprise: determining a first probability density function representing sample differences of the smooth, Gaussian, variable; determining a second probability density function representing sample differences of the jump, Cauchy, variable; and convolving the first probability density function and the second probability density function to generate the prior probability density function.

Convolving the first probability density function and the second probability density function to generate the prior probability density function may comprise: an analytical determination using at least one imaginary error function or Dawson function; and a numerical determination using a grid of sample points and interpolation for points between the grid of sample points.

Estimating the piecewise-smooth signal based on the estimate of the posterior probability density function may comprise estimating the piecewise-smooth signal based on a maximum a posteriori estimate of the posterior probability density function.

Estimating the piecewise-smooth signal based on a maximum a posteriori estimate of the posterior probability density function may comprise minimising a combination of a logarithm of the likelihood function and a logarithm of the prior probability density function.

Minimising the combination of the logarithm of the likelihood function and the logarithm of the prior probability density function may comprise applying one of: Newton's methods; and Barzilai-Borwein method.

Determining the posterior probability density function based on the likelihood function and the prior probability density function may further comprise determining the posterior probability density function based on a product of the likelihood function and the prior probability density function according to Bayes' Theorem.

The method may further comprise windowing the input signal.

The smooth, Gaussian, variable and the jump, Cauchy, variable may be independent of each other.

According to a third aspect there is provided an apparatus comprising: means for receiving an input signal, the input signal comprising a piecewise-smooth signal and a noise signal; means for determining a prior probability density function of a representation of the piecewise-smooth signal, the representation of the piecewise-smooth signal comprising a combination of a smooth, Gaussian, variable and a jump, Cauchy, variable; determining a likelihood function based on the input signal; means for determining a posterior probability density function based on the likelihood function and the prior probability density function distribution; and estimating the piecewise-smooth signal based on an estimate of a posterior probability density function.

The means for determining a prior probability density function of a representation of the piecewise-smooth signal, the representation of the piecewise-smooth signal comprising a combination of a smooth, Gaussian, variable and a jump, Cauchy, variable may further comprise: means for determining a first probability density function representing sample differences of the smooth, Gaussian, variable; means for determining a second probability density function representing sample differences of the jump, Cauchy, variable; and means for convolving the first probability density function and the second probability density function to generate the prior probability density function.

The means for convolving the first probability density function and the second probability density function to generate the prior probability density function may comprise: means for performing an analytical determination using at least one imaginary error function or Dawson function; and means for a numerical determination using a grid of sample points and interpolation for points between the grid of sample points.

The means for estimating the piecewise-smooth signal based on the estimate of the posterior probability density function may comprise means for estimating the piecewise-smooth signal based on a maximum a posteriori estimate of the posterior probability density function.

The means for estimating the piecewise-smooth signal based on a maximum a posteriori estimate of the posterior probability density function may comprise means for minimising a combination of a logarithm of the likelihood function and a logarithm of the prior probability density function.

The means for minimising the combination of the logarithm of the likelihood function and the logarithm of the prior probability density function may comprise means for applying one of: Newton's methods; and Barzilai-Borwein method.

The means for determining the posterior probability density function based on the likelihood function and the prior probability density function may further comprise means for determining the posterior probability density function based on a product of the likelihood function and the prior probability density function according to Bayes' Theorem.

The apparatus may further comprise means for windowing the input signal.

The smooth, Gaussian, variable and the jump, Cauchy, variable may be independent of each other.

In a further aspect there is provided a computer program comprising program code means adapted to perform the steps of the second aspect when the program is run on a data processing apparatus.

BRIEF DESCRIPTION OF DRAWINGS

To assist understanding of the present disclosure and to show how embodiments may be put into effect, reference is made by way of example to the accompanying drawings in which.

DETAILED DESCRIPTION

Figure 1A:
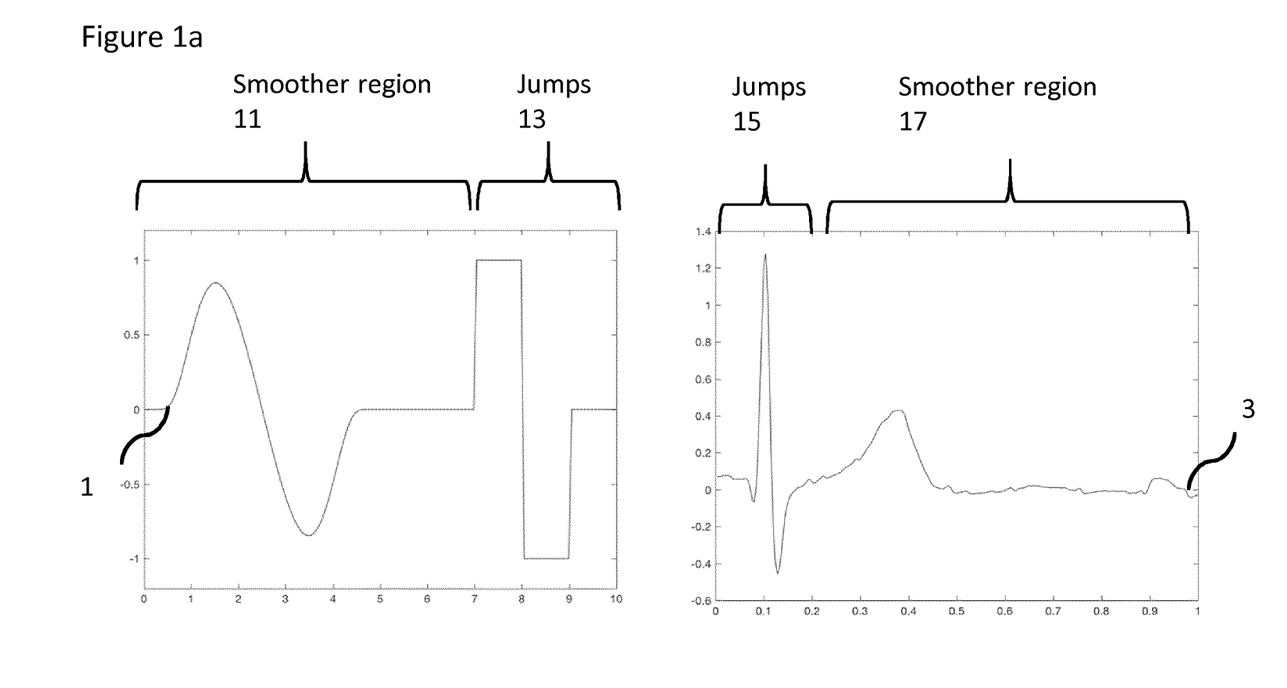
FIG. 1a schematically shows example waveforms with jump and smoother regions.

The examples disclosed in this application are applicable to apparatus, methods and such for processing piecewise-smooth signals, i.e. signals which have jumps and smoother regions. With respect to FIG. 1a is shown example signals 1 and 3. These signals 1, 3 are piecewise-smooth signals and comprise smoother regions 11, 17 and jumps 13, 15. A jump is a prominent signal feature that deviates from smoother regions in the signal. Peaks of an ECG signal, such as an R-peak, are examples of jumps. A jump may have a step-function like shape. Other shapes are possible. A jump may have abrupt or sudden start and end points. More specifically the concept concerns the estimation of a unknown piecewise-smooth signal u(t) from measurements m(t) which can be characterized using an observation equation m(t)=A(u(t))+e(t), where A is a function and e(t) is a signal originating from a noise process. In linear equations A can be a matrix (in a discretized form).

An example of the application of the signal processing as described herein is one of denoising a measured ECG signal. In such embodiments A can be chosen to be the identity operator and the measurements are of the form m(t)=u(t)+e(t). In this case, the problem is to estimate the signal u(t) from noise corrupted measurements m(t).

In other examples the processing may be a deconvolution of 1D (or 2D or higher dimension) signals (deblurring/sharpening of images) when A is chosen to be a convolution operator, or image restoration and in painting.

The concept as discussed in further detail hereafter features embodiments which to process the input signal using a signal which is presented as a sum of (Gaussian) smooth variable and (Cauchy distributed) variables representing jumps which are considered statistically and the methods (and apparatus) to determine the combined distribution of the sum without further estimation of variables. These embodiments therefore produce a solution which is simple and computationally effective (and thus in processor based implementations has low CPU and memory requirements).

Figure 1B:
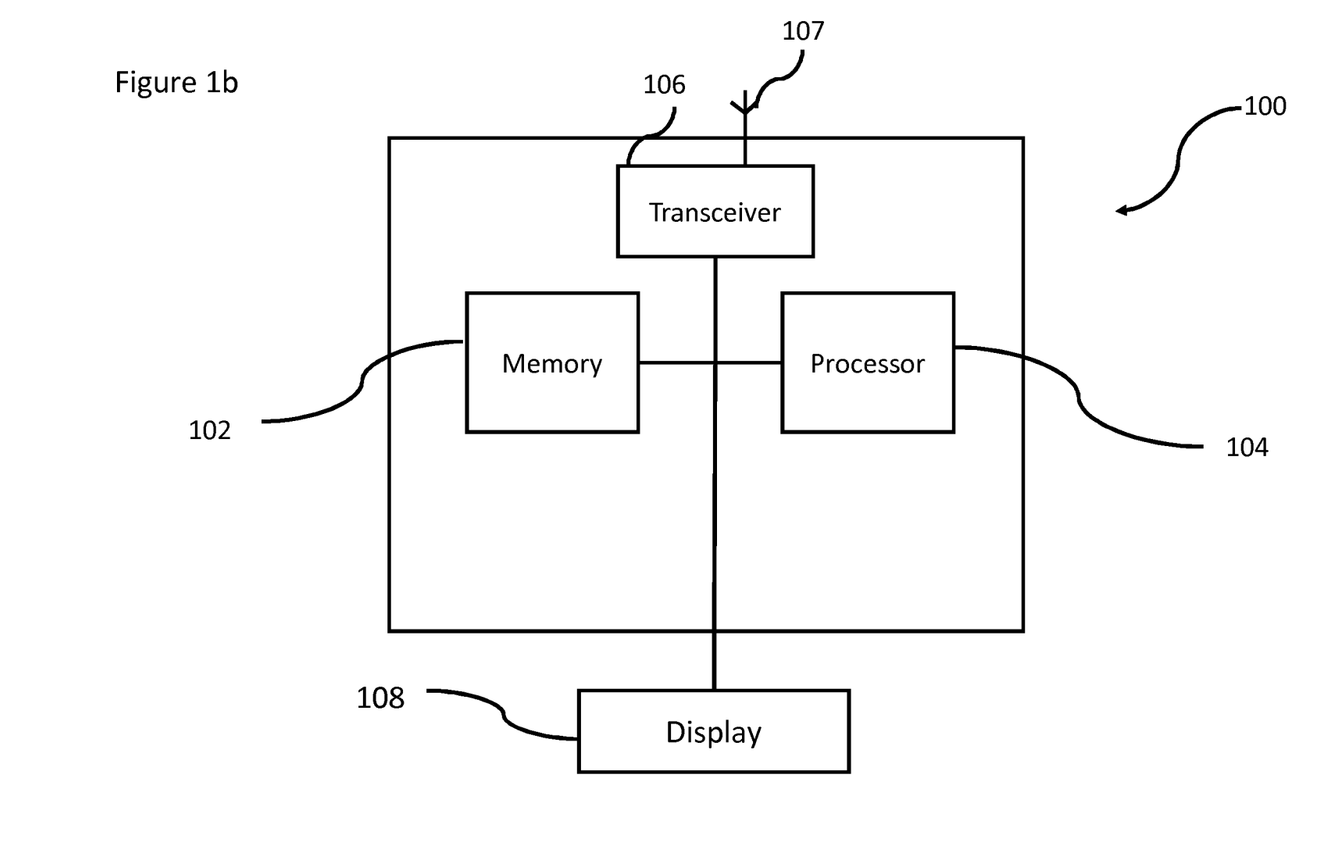
FIG. 1b schematically shows an apparatus suitable for implementing some embodiments.

With respect to FIG. 1b, an example of an apparatus 100 or system suitable for implementing some embodiments is shown. The apparatus 100 comprises a memory 102 and a processor 104. The apparatus 100 also comprises a transceiver at 106 for receiving information such as the signals to be analysed from other apparatus or devices.

In some embodiments the transceiver 106 is configured to receive user inputs, for example an input starting the analysis or changing statistical variables such as those described in further detail herein.

The transceiver 106 may also be configured to transmit information e.g. the processed signal information to other devices such as a remote display. The transceiver 106 may be configured to use any suitable protocol and coding system for the transmitting and/or receiving of information. Furthermore, although the transceiver 106 is shown connected to a wireless antenna 107 for communicating wirelessly with further apparatus or devices, in some embodiments the transceiver 106 is configured to communicate with the further apparatus or devices at least partially by wired connections.

In some embodiments the apparatus 100 also comprises, or is in communication with, a display 108 which enables the apparatus 100 to provide output in a visual fashion such that it can be interpreted by a user or viewer. For example the apparatus 100 may cause visual information to be provided on the display 108 which can be viewed by the user. In some embodiments the apparatus may furthermore comprise a signal source or sensor for providing the signal to be analysed directly such as a camera or imaging apparatus suitable for generating the image signals to be processed, or an ECG sensor for providing the ECG signals etc.

In some examples, the apparatus 100 and the processor 104 and memory 102 may be configured to execute programs in order to enable the functions and processing described hereafter to operate.

Although in the example above the apparatus 100 is shown as a single device and thus operates as a single or centralised apparatus in some embodiments, the functionality described hereafter may be enabled by a distributed system of apparatus communicating between each other. For example the functionality may be enabled in a cloud based system wherein apparatus or servers are physically or logically separated from each other.

In some embodiments the processor 104 is configured to implement a posterior probability density function algorithm and point estimation algorithm based on an input signal and other functions as discussed in further detail hereafter.

In the following examples the concept is explained with respect to specific example of a 1D signal. However it is understood that the same processes as described hereafter may be applied more generally to 2D (for example image data) or higher dimension signals which are piecewise-smooth signals as it would be understood that the higher dimension signals may be interpreted as a series of statistically independent 1D signals.

Figure 1C:
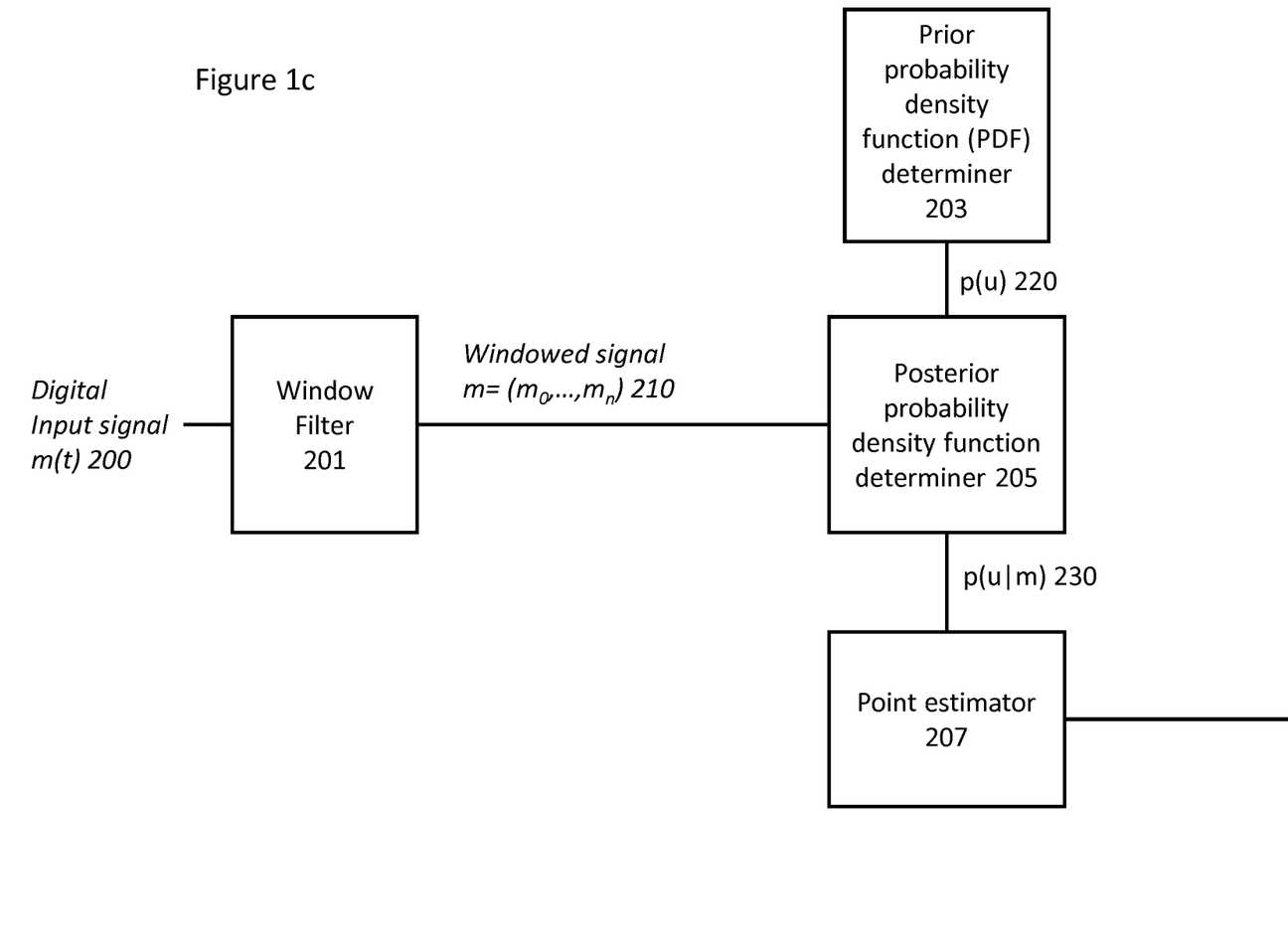
FIG. 1c schematically shows an example system suitable for implementing on the apparatus shown in FIG. 1b according to some embodiments.

With respect to FIG. 1c an example apparatus for implementing embodiments is shown.

The apparatus comprises an input for a digital input signal m(t) 200. The apparatus further comprises a window filter 201, a prior probability density function determiner 203, a posterior probability density function determiner 205 and a point estimator 207.

The window filter 201 is configured to receive the digital input signal m(t) 200 and generate a sequence of windowed sample periods each comprising a windowed signal m=$(m_0, \ldots, m_n)$ 210 where the sample length is n+1. In some embodiments the window filter 201 is configured to produce sequences which are separate and therefore succeeding and proceeding windows do not share samples. In some embodiments the window filter 201 is configured to produce at least partially overlapping sample sequences. The windowed signal 210 sample length can be any suitable sample length. The window filter 201 in some embodiments is configured to pass the windowed signal 210 to a posterior probability density function determiner 205.

In some embodiments the apparatus further comprises a prior probability density function (PDF) determiner 203. The prior probability density function (PDF) determiner 203 may be implemented in hardware or special purpose circuits, software, logic or any combination thereof. Furthermore some aspects of the prior probability density function (PDF) determiner 203 may be implemented in hardware, while other aspects may be implemented in firmware or software which may be executed by a controller, microprocessor or other computing device, although the invention is not limited thereto. While various aspects of the prior probability density function (PDF) determiner 203 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The prior probability density function (PDF) determiner 203 may thus be implemented by computer software executable by at least one data processor, such as in the processor entity, or by hardware, or by a combination of software and hardware. The prior probability density function (PDF) determiner 203 is configured to generate a prior PDF 220 based on a statistical determination wherein the signal is modelled as a sum of two random signals. The generated prior PDF 220 is passed to the posterior probability density function determiner 205.

The posterior probability density function determiner 205 may also be implemented in hardware or special purpose circuits, software, logic or any combination thereof. Furthermore some aspects of the posterior probability density function determiner 205 may be implemented in hardware, while other aspects may be implemented in firmware or software which may be executed by a controller, microprocessor or other computing device, although the invention is not limited thereto. While various aspects of the posterior probability density function determiner 205 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The posterior probability density function determiner 205 may thus be implemented by computer software executable by at least one data processor, such as in the processor entity, or by hardware, or by a combination of software and hardware. The posterior probability density function determiner 205 being configured to receive the windowed signal 210 and furthermore the prior PDF and by using a Bayesian method determine a posterior probability density function 230, denoted as p(u|m), for the window signal 210 and based on the prior PDF 220. The determined posterior probability density function 230 is then passed to a point estimator 207.

The point estimator 207 also may be implemented in hardware or special purpose circuits, software, logic or any combination thereof. Furthermore some aspects of the point estimator 207 may be implemented in hardware, while other aspects may be implemented in firmware or software which may be executed by a controller, microprocessor or other computing device, although the invention is not limited thereto. While various aspects of the point estimator 207 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The point estimator 207 may thus be implemented by computer software executable by at least one data processor, such as in the processor entity, or by hardware, or by a combination of software and hardware. The point estimator 207, being configured to receive the posterior probability density function 230, is configured to distinguish the piecewise-smooth signal from the noise component. This estimated signal point may be output.

Figure 2:
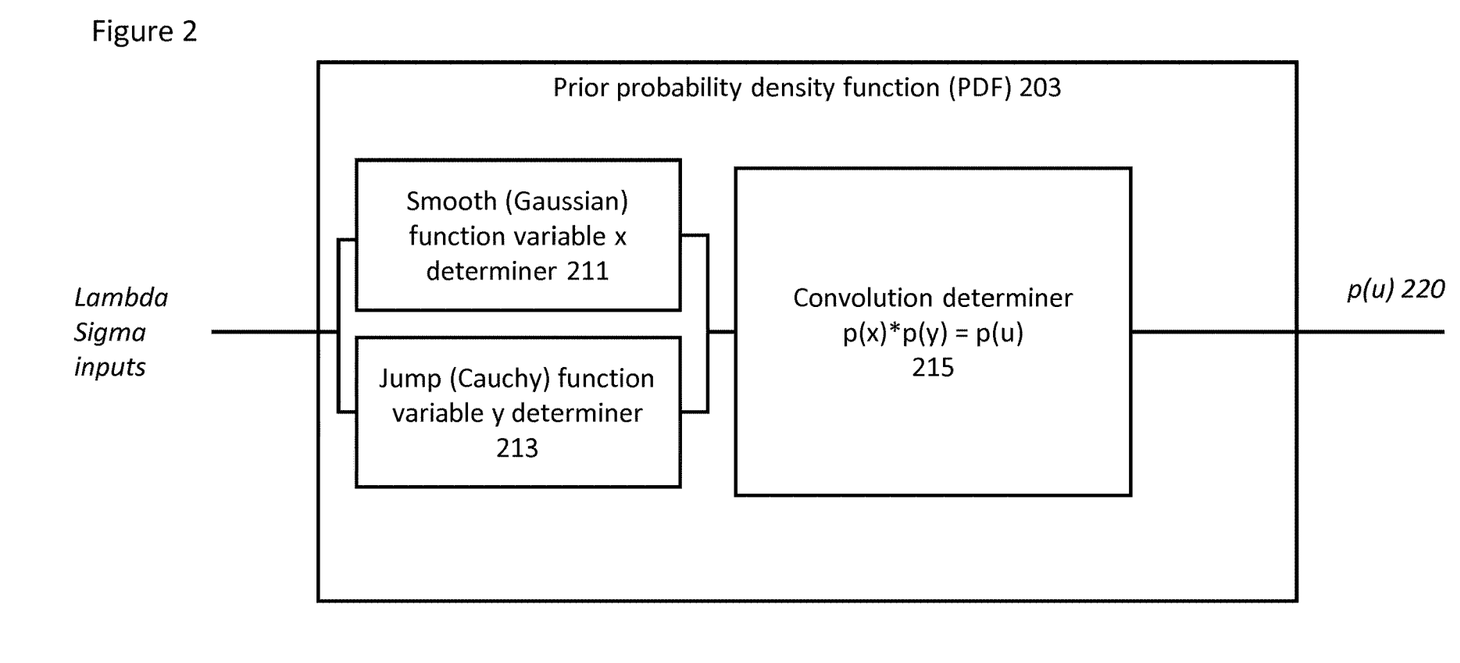
FIG. 2 schematically shows an example prior probability density function determiner as shown in FIG. 1c in further detail according to some embodiments.

With respect to FIG. 2 an example of the prior probability density function determiner 203 is shown in further detail. The prior probability density function determiner 203 in some embodiments is configured to receive a lambda λ and sigma σ input which controls the determination of a random variable based on a smooth (Gaussian) function and a jump (Cauchy) function. The prior probability density function determiner 203 can comprise a smooth (Gaussian) function variable determiner 211, a jump (Cauchy) function variable y determiner 213 and convolution determiner 215.

The smooth (Gaussian) function variable determiner 211 may be implemented in hardware or special purpose circuits, software, logic or any combination thereof. Furthermore some aspects of the smooth (Gaussian) function variable determiner 211 may be implemented in hardware, while other aspects may be implemented in firmware or software which may be executed by a controller, microprocessor or other computing device, although the invention is not limited thereto. While various aspects of the smooth (Gaussian) function variable determiner 211 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The smooth (Gaussian) function variable determiner 211 may thus be implemented by computer software executable by at least one data processor, such as in the processor entity, or by hardware, or by a combination of software and hardware. The smooth (Gaussian) function variable determiner 211 is configured to supply a suitable PDF for a smooth function x based on the sigma σ input, for example by using the following expression:

$$p(x) = p_x(x) = \prod_{k=1}^{n} \frac{1}{\sqrt{2\pi\sigma^2}} e^{-\frac{(x_k - x_{k-1})^2}{2\sigma^2}},$$

where $x_k$ (k=0, ..., n) are the values of x at discretization points.

This PDF p(x) may be passed to the convolution 215.

The jump (Cauchy) function variable determiner 213 may be implemented in hardware or special purpose circuits, software, logic or any combination thereof. Furthermore some aspects of the jump (Cauchy) function variable determiner 213 may be implemented in hardware, while other aspects may be implemented in firmware or software which may be executed by a controller, microprocessor or other computing device, although the invention is not limited thereto. While various aspects of the jump (Cauchy) function variable determiner 213 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The jump (Cauchy) function variable determiner 213 may thus be implemented by computer software executable by at least one data processor, such as in the processor entity, or by hardware, or by a combination of software and hardware. The jump (Cauchy) function variable determiner 213 is configured to supply a suitable PDF for a jump function y based on the lambda λ input, for example by using the following expression:

$$p(y) = p_y(y) = \prod_{k=1}^{n} \frac{\lambda}{\pi(\lambda^2 + (y_k - y_{k-1})^2)},$$

where $y_k$ (k=0, ..., n) are the values of y at the discretization points.

This PDF p(y) may be passed to the convolution determiner 215.

The convolution determiner 215 may be implemented in hardware or special purpose circuits, software, logic or any combination thereof. Furthermore some aspects of the convolution determiner 215 may be implemented in hardware, while other aspects may be implemented in firmware or software which may be executed by a controller, microprocessor or other computing device, although the invention is not limited thereto. While various aspects of the convolution determiner 215 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The convolution determiner 215 may thus be implemented by computer software executable by at least one data processor, such as in the processor entity, or by hardware, or by a combination of software and hardware. The convolution determiner 215 being configured to receive the smooth p(x) and jump p(y) PDFs is configured to convolve them to determine a PDF of the sum of the smooth x and jump y variables. The convolution determiner 215 for example may calculate the convolution as follows:

$$p(u) = p_u(u) = \Pi_{k=1}^n f(x_k - x_{k-1})$$

where f is the convolution of Gaussian p(x) and Cauchy p(y) marginal densities

For example the convolution can be calculated:

$$f(u) = \frac{e^{-\frac{(u+i\lambda)^2}{2\sigma^2}}\left(1 + e^{\frac{2iu\lambda}{\sigma^2}}\left(1 - i\,\mathrm{Erfi}\left(\frac{u - i\lambda}{\sqrt{2}\,\sigma}\right)\right) + i\,\mathrm{Erfi}\left(\frac{u + i\lambda}{\sqrt{2}\,\sigma}\right)\right)}{2\sqrt{2\pi\sigma^2}}$$

where Erfi(z) is the imaginary error function, the imaginary error function being an entire function defined by Erfi(z)=−ierf(i z). As another example, the convolution determiner 215 may in some embodiments use a Dawson function F to express the result of the convolution:

$$f(u) \propto \frac{1}{2}\sqrt{\pi}\left(e^{-\frac{(u-i\lambda)^2}{2\sigma^2}} + e^{-\frac{(u+i\lambda)^2}{2\sigma^2}}\right) - i\,F\left(\frac{u - i\lambda}{\sqrt{2}\,\sigma}\right) + i\,F\left(\frac{u + i\lambda}{\sqrt{2}\,\sigma}\right),$$

where the Dawson function F is defined as $$F(x) = e^{-x^2}\int_0^x e^{y^2} = \tfrac{1}{2}\sqrt{\pi}e^{-x^2}\mathrm{erfi}(x).$$

The determined convolution, the prior probability density function p(u) may then be output from the prior probability density function determiner 203. In some embodiments the prior probability density function determiner 203 may comprise a set of pre-determined parameters which are passed to the posterior probability density function determiner 205. In some embodiments, the prior probability density function is implemented as a look-up-table of values accessed via pre-configured parameter values λ and σ.

In other words in some embodiments the prior probability density function may be implemented as pre-determined values within a memory.

Figure 3:
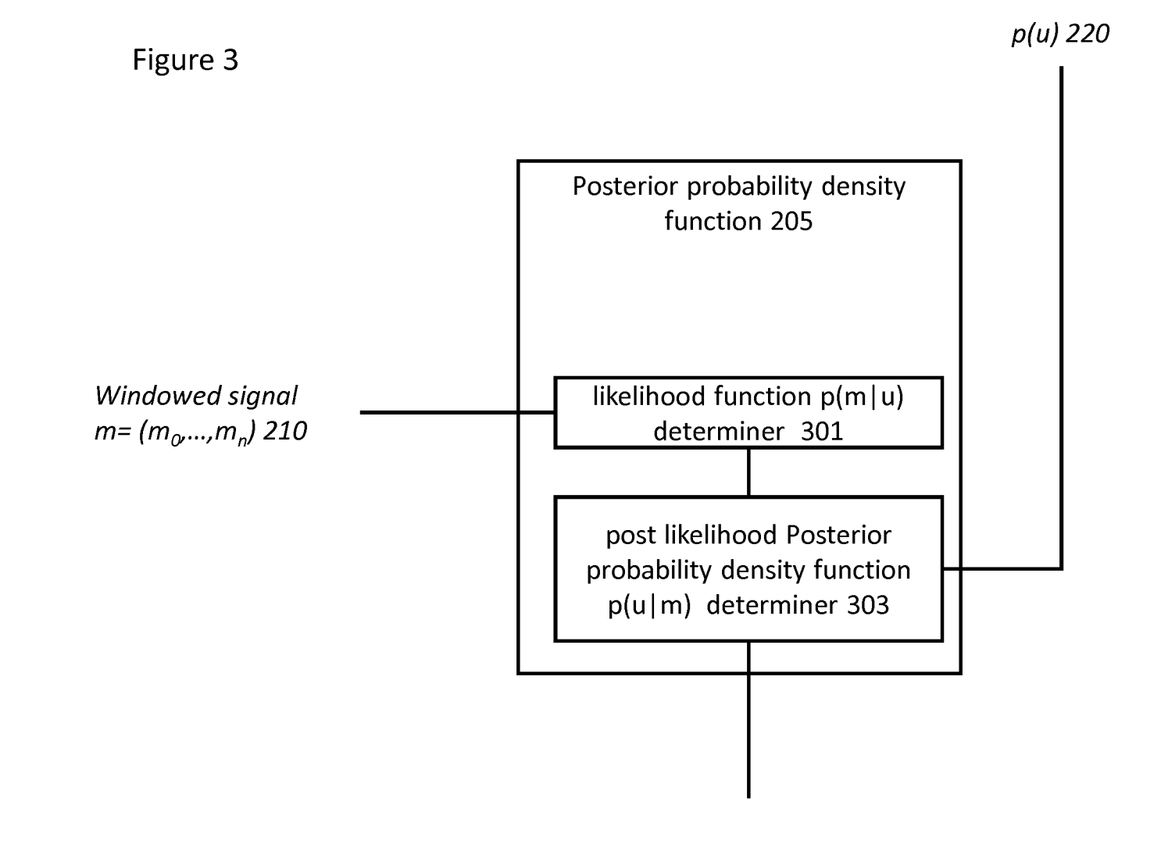
FIG. 3 schematically shows an example posterior probability density function determiner as implemented in FIG. 1c according to some embodiments.

In some embodiments FIG. 3 shows a posterior probability density function determiner 205. The posterior probability density function determiner 205 comprises a likelihood function determiner 301 and a post likelihood posterior probability density function determiner 303.

The likelihood function p(m|u) determiner 301 may be implemented in hardware or special purpose circuits, software, logic or any combination thereof. Furthermore some aspects of the likelihood function determiner 301 may be implemented in hardware, while other aspects may be implemented in firmware or software which may be executed by a controller, microprocessor or other computing device, although the invention is not limited thereto. While various aspects of the likelihood function determiner 301 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The likelihood function determiner 301 may thus be implemented by computer software executable by at least one data processor, such as in the processor entity, or by hardware, or by a combination of software and hardware. The likelihood function determiner 301, being configured to receive the windowed signal 210, is configured to determine the likelihood function. A likelihood is the hypothetical probability that an event that has already occurred would yield a specific outcome. The concept differs from that of a probability in that a probability refers to the occurrence of future events, while a likelihood refers to past events with known outcomes.

The likelihood function may be determined from the model of the input signal m(t). If we model the measurement as m(t)=A(u(t))+e(t) as above and e(t) is modelled as a Gaussian and identically distributed variable (e.g. white noise), then $$p(m\,|\,u) = \prod_t \frac{1}{\sqrt{2\pi\sigma_e^2}}e^{-\frac{(m(t) - A(u(t)))^2}{2\sigma_e^2}} \Rightarrow \log p(m\,|\,u) = \frac{1}{2\sigma_e^2}\|m - A(u)\|^2 + \text{constant},$$

where the norm is the L2-norm (the sum of squares).

The determined likelihood function may be passed to the post likelihood posterior probability density function determiner 303.

In some embodiments the post likelihood posterior probability density function determiner 303 may be implemented in hardware or special purpose circuits, software, logic or any combination thereof. Furthermore some aspects of the post likelihood posterior probability density function determiner 303 may be implemented in hardware, while other aspects may be implemented in firmware or software which may be executed by a controller, microprocessor or other computing device, although the invention is not limited thereto. While various aspects of the post likelihood posterior probability density function determiner 303 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The post likelihood posterior probability density function 303 may thus be implemented by computer software executable by at least one data processor, such as in the processor entity, or by hardware, or by a combination of software and hardware. The post likelihood posterior probability density function determiner 303, being configured to receive the prior PDF and the determined likelihood function is configured to determine the posterior probability density function p(u|m) by using Bayes theorem such that:

$$p(u\,|\,m) = \frac{p(m\,|\,u)p(u)}{p(m)} \propto p(m\,|\,u)p(u)$$

where p(m|u) is the likelihood function and p(u) is the prior probability density function (the result of the convolution). The posterior probability density function p(u|m) (or the logarithm of p(u|m) in some embodiments) may be output to a point estimator 207.

Figure 4:
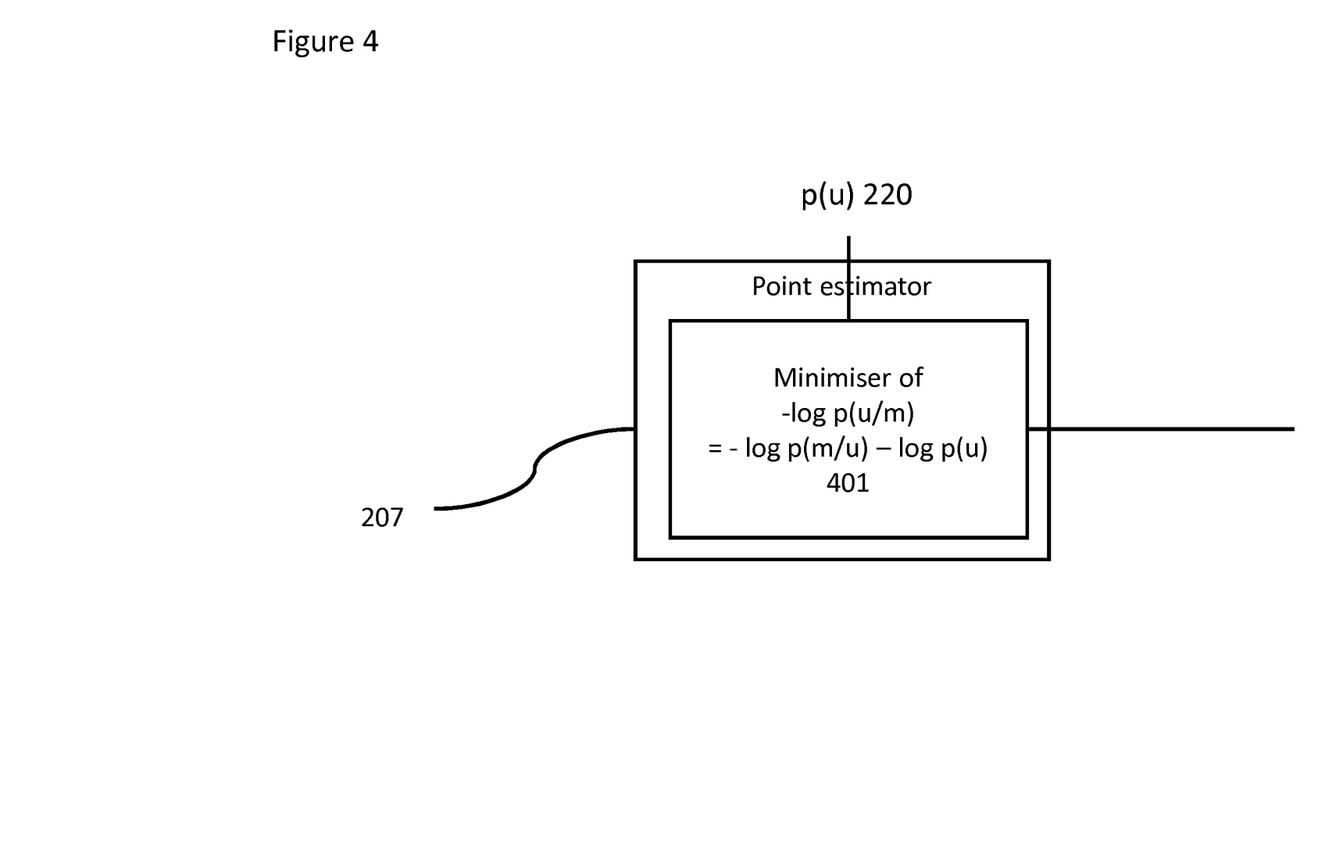
FIG. 4 schematically shows an example point estimator as implemented in FIG. 1c according to some embodiments.

FIG. 4 shows an example point estimator 207 comprising a minimiser 401. The minimiser 401 may be implemented in hardware or special purpose circuits, software, logic or any combination thereof. Furthermore some aspects of the minimiser 401 may be implemented in hardware, while other aspects may be implemented in firmware or software which may be executed by a controller, microprocessor or other computing device, although the invention is not limited thereto. While various aspects of the minimiser 401 may be implemented in, as non-limiting examples, hardware, software, firmware, special purpose circuits or logic, general purpose hardware or controller or other computing devices, a software module (e.g. a library function), physical circuitry (e.g. an ASIC), a programmed microprocessor or some combination thereof. The minimiser 401 may thus be implemented by computer software executable by at least one data processor, such as in the processor entity, or by hardware, or by a combination of software and hardware. The minimiser 401, being configured to receive the posterior probability density function p (u|m) 220, is configured to generate a suitable point estimate by minimising the posterior probability density function. For example in some embodiments the minimiser 401 is configured to determine a maximum a priori (MAP) estimate which is the maximum point of the posterior probability density function. In practice, the MAP estimate can be computed by minimizing the function $$-\log p(u|m) = -\log p(m|u) - \log p(u).$$

The minimization can be carried out using any suitable method, for example, using Newton's methods or Barzilai-Borwein method.

Figure 5:
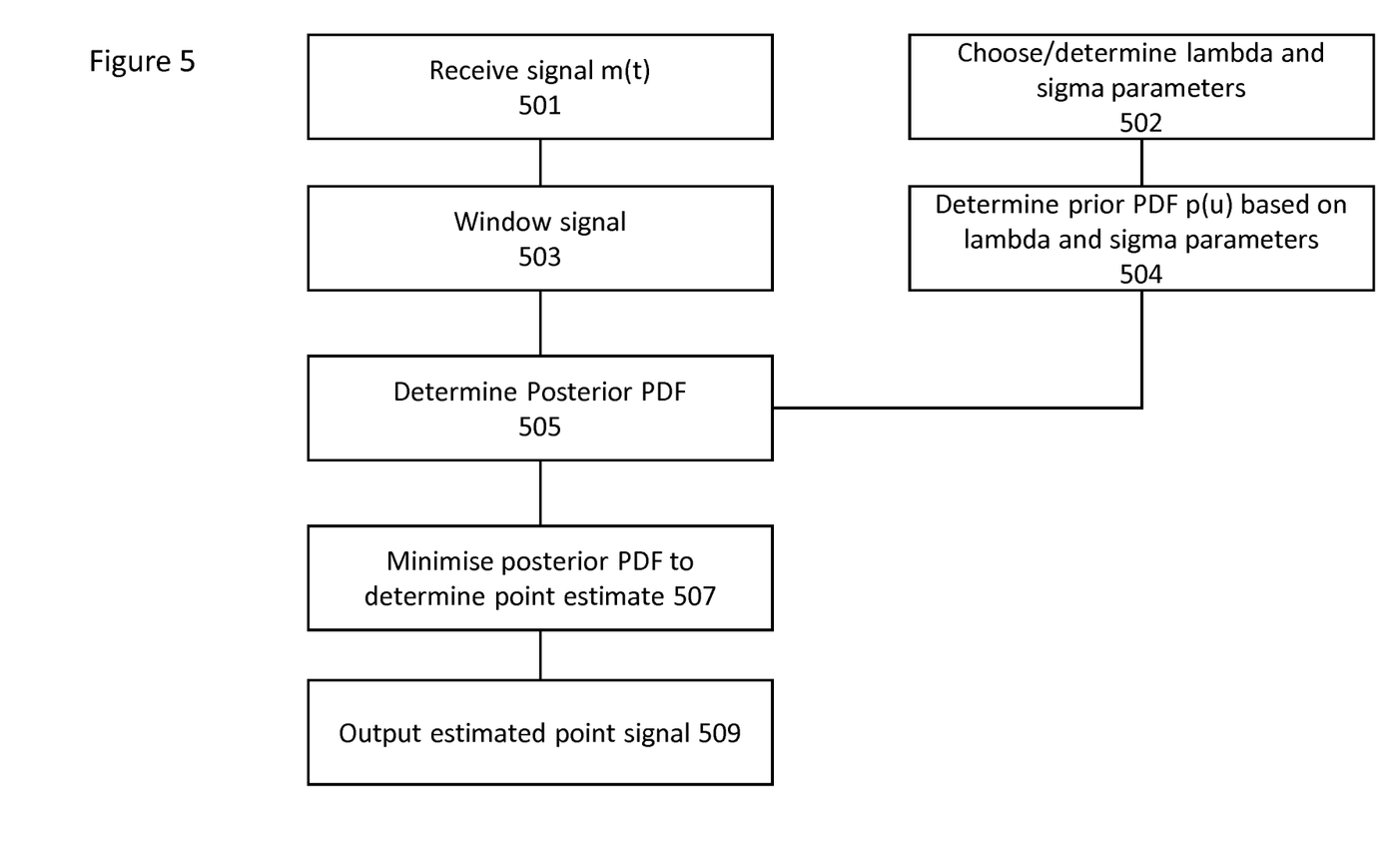
FIG. 5 shows a flow chart showing the operations of the example system according to some embodiments.

FIG. 5 shows an example flow diagram showing the operations of the example system according to some embodiments.

First the signal m(t), which comprises the piecewise-smooth signal u(t) and noise e(t), is measured or received as shown in FIG. 5 by step 501.

Then the signal m(t) is windowed to generate the windowed signal 210 as shown in FIG. 5 by step 503.

In some embodiments the lambda and sigma parameters for the smooth x and jump y variables are chosen as shown in FIG. 5 by step 502.

Furthermore in those embodiments the prior PDF is constructed by prescribing the PDFs for the smooth parts x and jumps y and then convolving the PDFs to generate the prior probability density function p(u)=p(x)*p(y), in other words the probability density function representing the sum of the smooth and jump variables as shown in FIG. 5 step 504.

Having determined a prior probability density function p(u) and likelihood function p(m|u), the posterior probability density function p(u|m) (or the log p(u|m)) is determined as shown in FIG. 5 by step 505.

Then a minimised posterior probability density function is determined in order to determine a point estimate as shown in FIG. 5 step 507.

This point estimate may then be output as shown in FIG. 5 by step 509.

Figure 6:
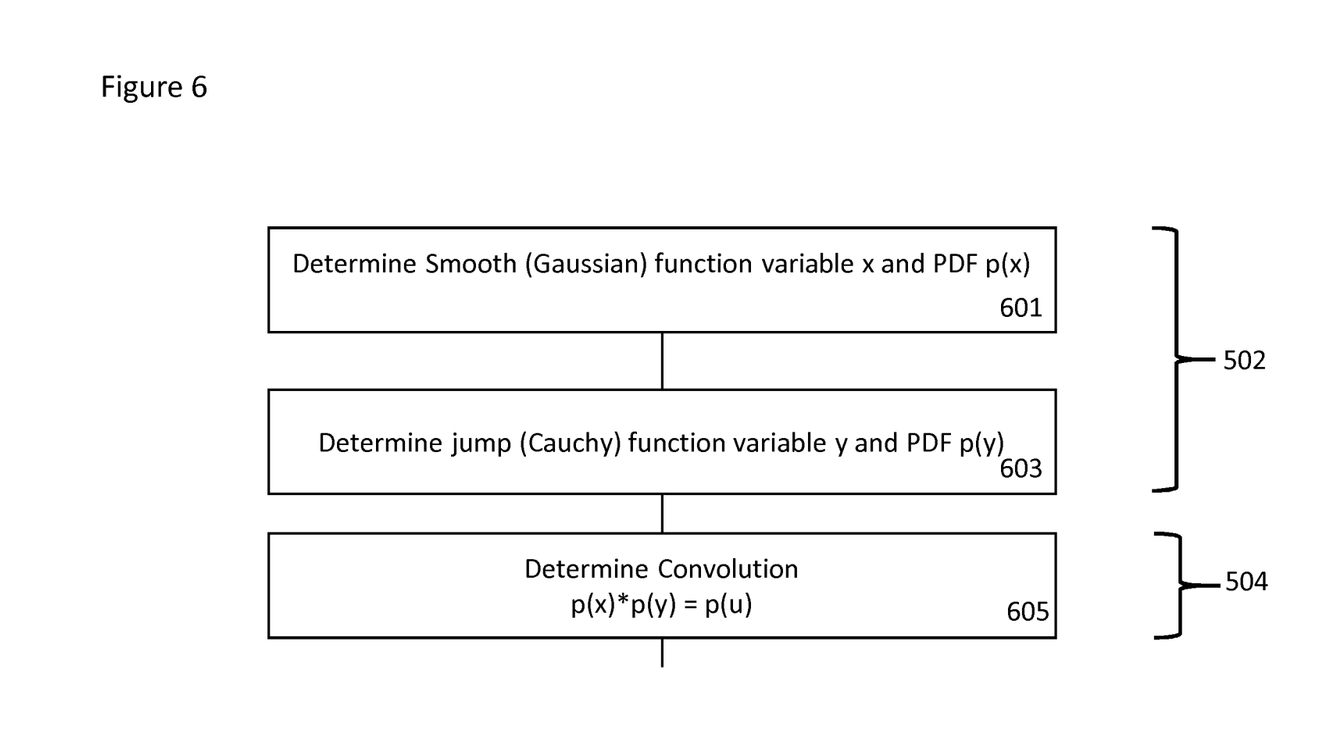
FIG. 6 shows a flow chart showing the operations of the example prior probability density function determiner according to some embodiments.

FIG. 6 shows a flow chart showing the operations of the example probability density function determiner according to some embodiments in further detail.

First a smooth function variable x and the PDF p(x) are generated (and in some embodiments based on a sigma input) as shown in FIG. 6 by step 601.

Then a jump function variable and the PDF p(y) are generated (and in some embodiments based on a lambda input) as shown in FIG. 6 by step 603.

Then a prior PDF is generated by applying a convolution to the p(x) and p(y) PDFs as shown in FIG. 6 by step 605.

Figure 7:
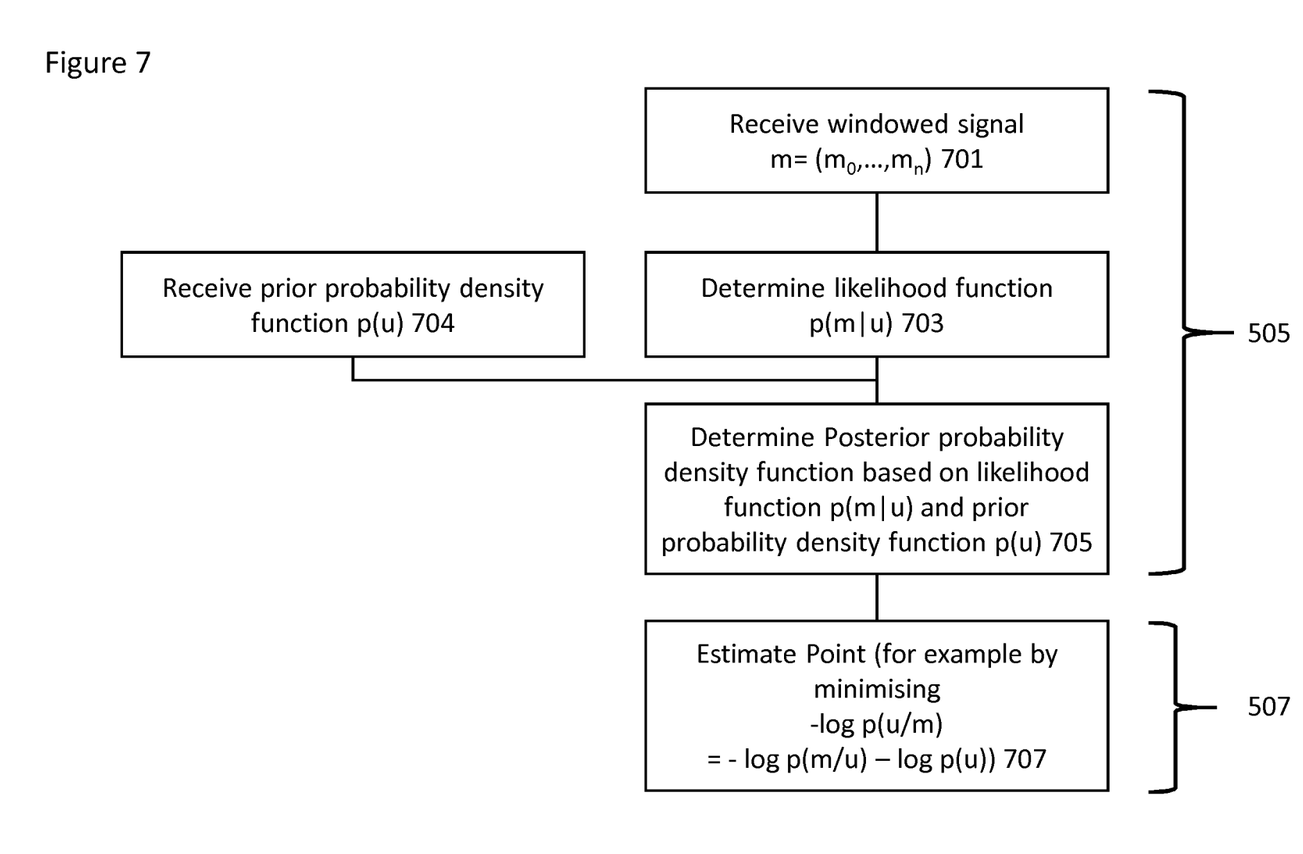
FIG. 7 shows a flow chart showing the operations of the example posterior density function determiner and point estimator according to some embodiments.

FIG. 7 shows a flow chart showing the operations of the example posterior probability density function determiner and point estimator according to some embodiments.

The first operation is receiving the windowed signal 210 as shown in FIG. 7 by step 701.

Then the likelihood function PDF p(m|u) may be determined from the windowed signal 210 as shown in FIG. 7 by step 703.

Also the prior probability density function p(u) is received or retrieved as shown in FIG. 7 by step 704.

The method then may comprise determining the posterior probability density function p(u|m) based on the likelihood function p(m|u) and the prior probability density function p(u) as shown in FIG. 7 by step 705.

Then the method may then comprise estimating the point (for example by minimising the posterior probability density function p(u|m) (or −log p(u|m)) as shown in FIG. 7 by step 707.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising at least one processor, and at least one memory including computer program code, wherein the at least one memory and the computer program code are configured, with the at least one processor, to:
   receive an input signal, the input signal comprising a piecewise-smooth signal and a noise signal;
   determine a prior probability density function of a representation of the piecewise-smooth signal, the representation of the piecewise-smooth signal comprising a combination of a smooth, Gaussian, variable and a jump, Cauchy, variable;
   determine a likelihood function based on the input signal;
   determine a posterior probability density function based on the likelihood function and the prior probability density function distribution; and
   estimate the piecewise-smooth signal based on an estimate of a posterior probability density function.

2. The apparatus according to claim 1, wherein the processor configured to determine a prior probability density function of a representation of the piecewise-smooth signal, the representation of the piecewise-smooth signal comprising a combination of a smooth, Gaussian, variable and a jump, Cauchy, variable is further configured to:
   determine a first probability density function representing sample differences of the smooth, Gaussian, variable;
   determine a second probability density function representing sample differences of the jump, Cauchy, variable; and
   convolve the first probability density function and the second probability density function to generate the prior probability density function.

3. The apparatus according to claim 2, wherein the processor configured to convolve the first probability density function and the second probability density function to generate the prior probability density function is configured to determine:
   an analytical determination using at least one imaginary error function or Dawson function; and
   a numerical determination using a grid of sample points and interpolation for points between the grid of sample points.

4. The apparatus as claimed in claim 1, wherein the processor configured to estimate the piecewise-smooth signal based on the estimate of the posterior probability density function is configured to estimate the piecewise-smooth signal based on a maximum a posteriori estimate of the posterior probability density function.

5. The apparatus according to claim 4, wherein the processor configured to estimate the piecewise-smooth signal based on a maximum a posteriori estimate of the posterior probability density function is further configured to minimize a combination of a logarithm of the likelihood function and a logarithm of the prior probability density function.

6. The apparatus according to claim 5, wherein the processor configured to minimise the combination of the logarithm of the likelihood function and the logarithm of the prior probability density function is configured to apply one of:
   Newton's methods; or
   Barzilai-Borwein method.

7. The apparatus according to claim 1, wherein the processor configured to determine the posterior probability density function based on the likelihood function and the prior probability density function is further configured to determine the posterior probability density function based on a product of the likelihood function and the prior probability density function according to Bayes' Theorem.

8. The apparatus according to claim 1, wherein the processor is further configured to window the input signal.

9. The apparatus according to claim 1, wherein the smooth, Gaussian, variable and the jump, Cauchy, variable are independent of each other.

10. A method comprising:
    receiving an input signal, the input signal comprising a piecewise-smooth signal and a noise signal;
    determining a prior probability density function of a representation of the piecewise-smooth signal, the representation of the piecewise-smooth signal comprising a combination of a smooth, Gaussian, variable and a jump, Cauchy, variable;
    determining a likelihood function based on the input signal;
    determining a posterior probability density function based on the likelihood function and the prior probability density function distribution; and
    estimating the piecewise-smooth signal based on an estimate of a posterior probability density function.

11. The method according to claim 10, wherein determining a prior probability density function of a representation of the piecewise-smooth signal, the representation of the piecewise-smooth signal comprising a combination of a smooth, Gaussian, variable and a jump, Cauchy, variable further comprises:
    determining a first probability density function representing sample differences of the smooth, Gaussian, variable;
    determining a second probability density function representing sample differences of the jump, Cauchy, variable; and
    convolving the first probability density function and the second probability density function to generate the prior probability density function.

12. The method according to claim 11, wherein convolving the first probability density function and the second probability density function to generate the prior probability density function comprises:
    an analytical determination using at least one imaginary error function or Dawson function; and
    a numerical determination using a grid of sample points and interpolation for points between the grid of sample points.

13. The method as claimed in claim 10, wherein estimating the piecewise-smooth signal based on the estimate of the posterior probability density function comprises estimating the piecewise-smooth signal based on a maximum a posteriori estimate of the posterior probability density function.

14. The method according to claim 13, wherein estimating the piecewise-smooth signal based on a maximum a posteriori estimate of the posterior probability density function comprises minimising a combination of a logarithm of the likelihood function and a logarithm of the prior probability density function.

15. The method according to claim 10, wherein determining the posterior probability density function based on the likelihood function and the prior probability density function further comprises determining the posterior probability density function based on a product of the likelihood function and the prior probability density function according to Bayes' Theorem.

16. A non-transitory computer readable medium comprising program instructions for causing an apparatus to perform at least the following:
- receiving an input signal, the input signal comprising a piecewise-smooth signal and a noise signal;
- determining a prior probability density function of a representation of the piecewise-smooth signal, the representation of the piecewise-smooth signal comprising a combination of a smooth, Gaussian, variable and a jump, Cauchy, variable;
- determining a likelihood function based on the input signal;
- determining a posterior probability density function based on the likelihood function and the prior probability density function distribution; and
- estimating the piecewise-smooth signal based on an estimate of a posterior probability density function.

* * * * *